United States Patent [19]

Pacosz

[11] Patent Number: 5,626,770

[45] Date of Patent: May 6, 1997

[54] APPARATUS AND METHOD FOR FILTERING USED ENGINE COOLANT

[75] Inventor: Richard W. Pacosz, Myrtle Beach, S.C.

[73] Assignee: Recovery Systems, Inc., Myrtle Beach, S.C.

[21] Appl. No.: 509,998

[22] Filed: Aug. 1, 1995

[51] Int. Cl.⁶ .................................. B01D 35/027
[52] U.S. Cl. .................... 210/799; 210/168; 210/416.5
[58] Field of Search .................... 210/168, 241, 210/252, 257.1, 258, 260, 264, 282, 416.1, 416.5, 167, 799

[56] References Cited

U.S. PATENT DOCUMENTS

| | | | |
|---|---|---|---|
| 4,015,613 | 4/1977 | Papworth | 134/102 |
| 4,276,914 | 7/1981 | Albertson | 141/92 |
| 5,228,985 | 7/1993 | Wells et al. | 210/167 |
| 5,340,471 | 8/1994 | Wilson et al. | 210/167 |

*Primary Examiner*—W. L. Walker
*Attorney, Agent, or Firm*—Ralph Bailey

[57] ABSTRACT

A tank (A) stores pre-filtered anti-freeze liquid received from a pre-filter (B) for removing hydrocarbons carried within a drain pan (C) positioned beneath a radiator in an automotive vehicle. The pre-filtered anti-freeze liquid is introduced into a cartridge filter having a closure provided by a removable plug (D) for introducing diatomaceous earth into one of a serially arranged set of filters.

5 Claims, 3 Drawing Sheets

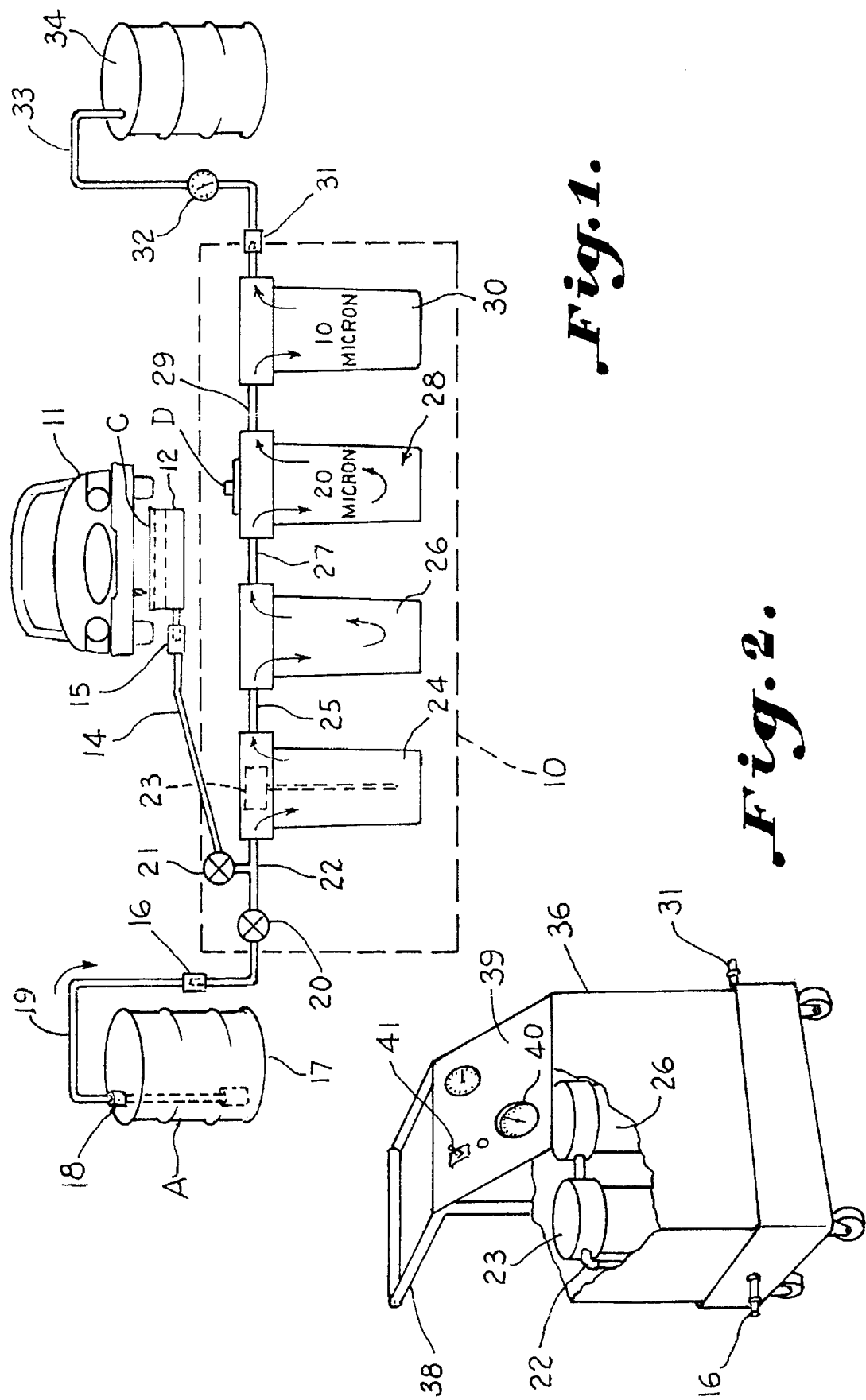

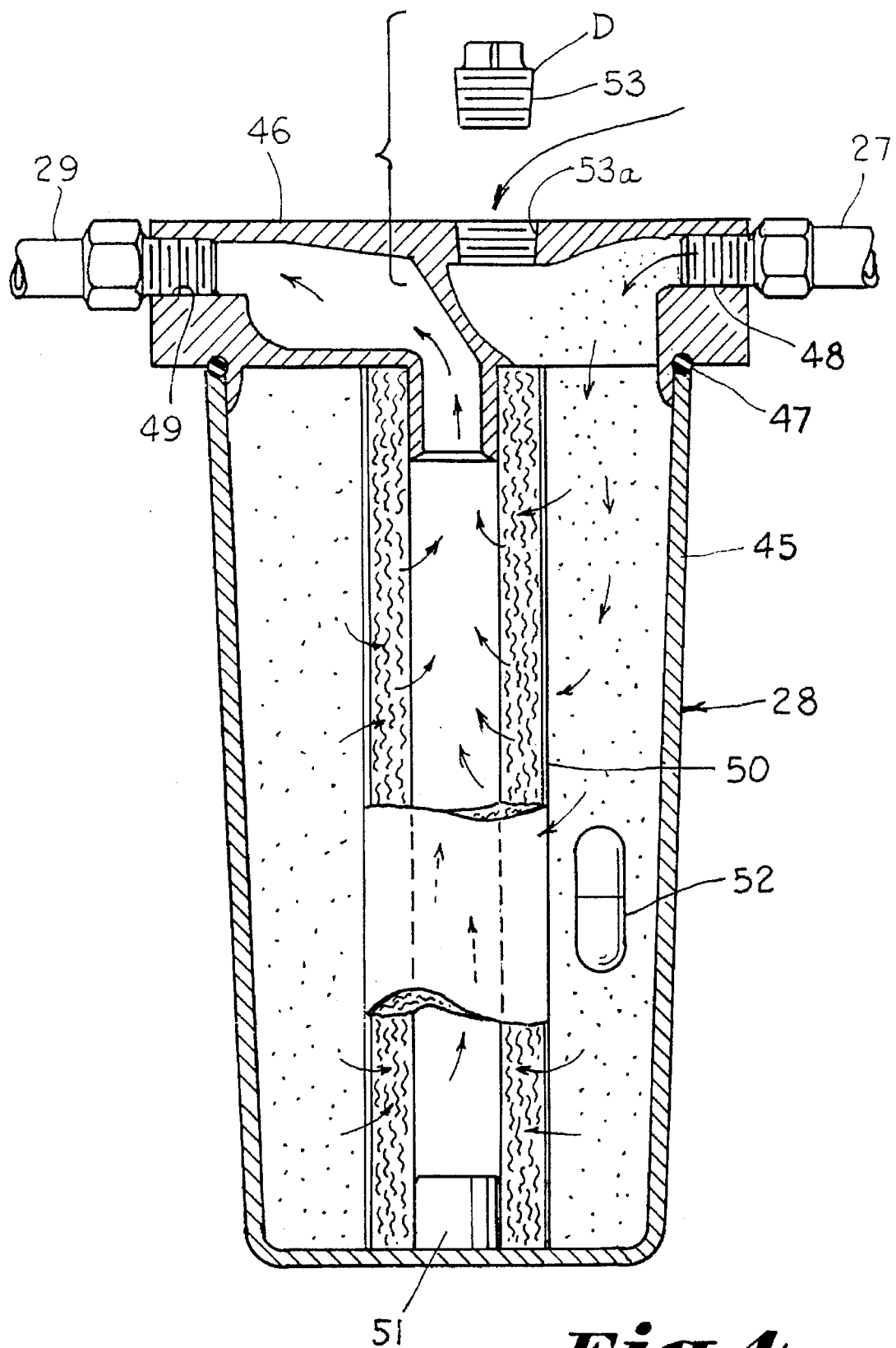

APPARATUS AND METHOD FOR FILTERING USED ENGINE COOLANT

BACKGROUND OF THE INVENTION

This invention relates to portable filtering apparatus and method for removing contaminants from used anti-freeze liquid by subjecting same to the action of serially arranged filters.

Heretofore filtering apparatus employed in an attempt to restore used anti-freeze liquid to a usable condition for automotive purposes either had limited effectiveness or was so complex as to be unjustifiably expensive. The prior art includes U.S. Pat. No. 5,091,081 which illustrates the use of serial filters including what is referred to as a pre-filter and following the pre-filter an ultrafiltration filter for use in filtering ethylene glycol anti-freeze liquid. A test kit contemplating the use of additives for restoring desirable characteristics to the coolant liquid is provided. The prior art is further illustrated and described in U.S. Pat. No. 5,174,902 which contemplates restoring anti-freeze coolant liquid to a usable state employing a particular cation exchanger. Conventional methods for purifying and recycling anti-freeze are also described including the use of diatomaceous earth as a filtering medium. The state of the art is further illustrated by U.S. Pat. Nos. 5,104,529, 5,407,564 and 5,395,514. Devices for collecting used oil are illustrated in U.S. Pat. Nos. 1,396,416 and 5,377,728.

SUMMARY OF THE INVENTION

Accordingly, it is an important object of the present invention to provide improved apparatus and method for filtering and purifying used anti-freeze liquid such as ethylene glycol utilizing a pre-filter placed beneath the automobile for removing hydrocarbons preparatory to subjecting the pre-filtered anti-freeze liquid to the action of serially arranged filters.

It is a further object of the invention to improve the filtering action of a cartridge filter utilized as at least one of the serially arranged filters wherein a removable plug is provided for the introduction of diatomaceous earth in the form of a suitable package such as a capsule capable of degrading in the anti-freeze liquid for spreading the diatomaceous earth across the filter element which may be provided in the form of a paper filter for enhancing the filtering capacity of the filter.

Another important object of the invention is the provision of filters for removing progressively smaller contaminant particles utilizing a pleated paper spin in filter for initially removing the larger contaminants prior to filtration utilizing filters capable of removing progressively smaller particles wherein a paper cartridge is utilized in at least one of several serially arranged filters.

Another important object of the invention is the provision of a pre-filter for placement in a collection pan beneath the vehicle for receiving the coolant fluid from the radiator for pre-filtering prior to placement in a storage drum preparatory for transporting same directly to a plurality of serially arranged filters which are preferably carried within a wheeled cart.

While the invention is described in the context of automotive vehicles wherein conventional anti-freeze liquid is used it is to be understood that the invention is useful with any used coolant fluid.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a schematic drawing illustrating a pre-filter placed beneath an automotive vehicle for receiving used anti-freeze or coolant liquid and for transporting same either to a collection drum or directly to serially arranged filters for finally delivering the purified anti-freeze liquid to a suitable vessel for receiving same for further use constructed in accordance with the invention;

FIG. 2 is a perspective view illustrating the use of a wheeled cart and the like for providing a portable filter arrangement for use in containing the filter components illustrated in FIG. 1 facilitating their use;

FIG. 4 is a sectional elevation illustrating a cartridge filter having a housing provided with a closure which may be opened for the introduction of diatomaceous earth preferable in the form of a degradable package such as a capsule constructed in accordance with the present invention with parts broken away for clarity of illustration.

DESCRIPTION OF A PREFERRED EMBODIMENT

Figure 3:
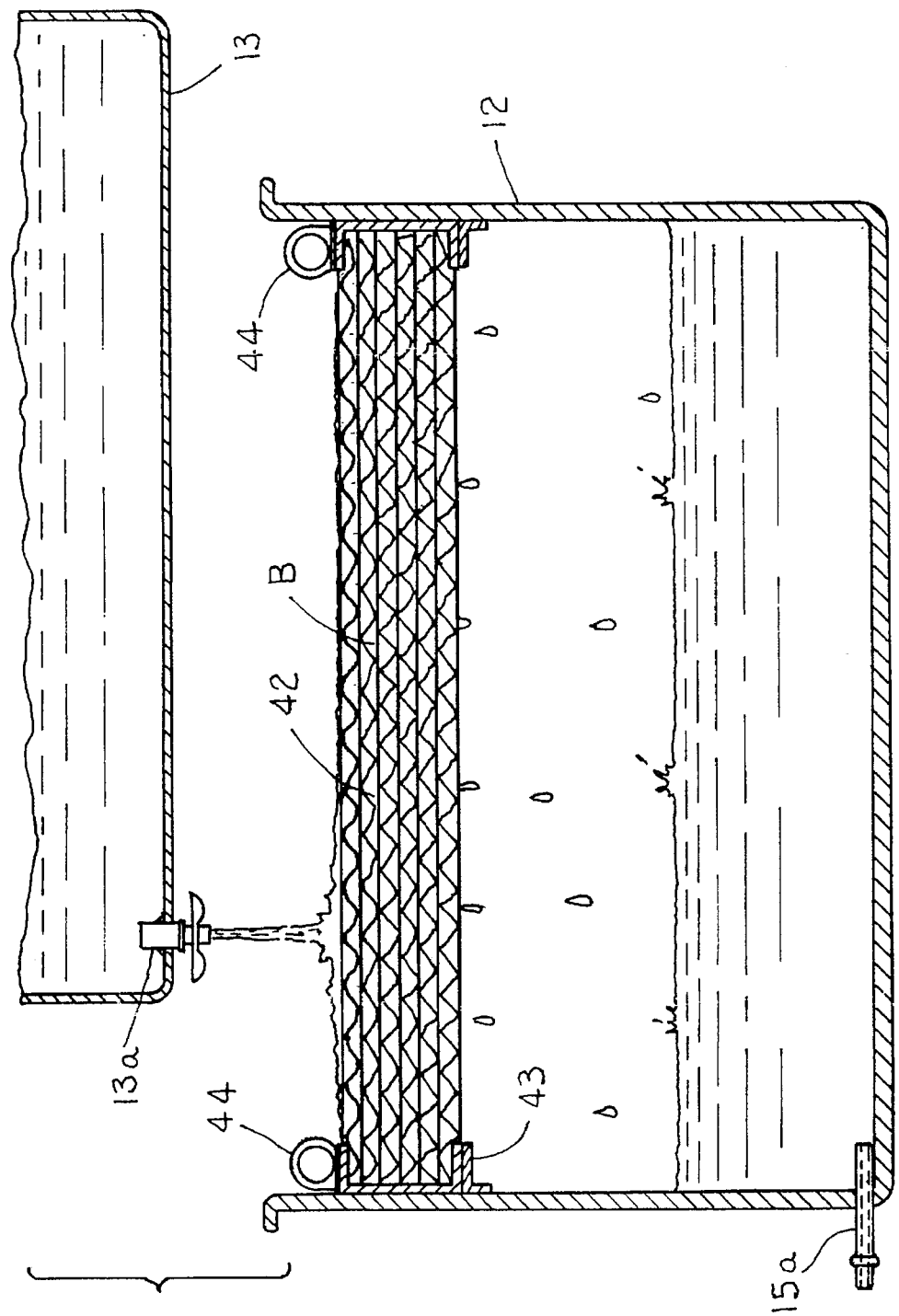
FIG. 3 is an enlarged sectional elevation illustrating the collection pan and pre-filter for receiving the used coolant from the radiator of an automotive vehicle.

The drawings illustrate apparatus for filtering out hydrocarbons and particulate matter introduced into anti-freeze liquid through use in automotive vehicles includes a tank A for storing used anti-freeze liquid removed from automotive vehicles. A pre-filter B is placed beneath an automotive vehicle for receiving used anti-freeze liquid from the cooling system of the automotive vehicle. A drain pan C carries the pre-filter for positioning the pre-filter beneath said automotive vehicle for receiving and pre-filtering said anti-freeze liquid removing hydrocarbons therefrom and for receiving the pre-filtered anti-freeze liquid prior to transporting same to the tank A. A plurality of serially disposed filters received pre-filtered anti-freeze liquid from the tank for removing particulate matter from the pre-filtered anti-freeze liquid. Thus, the used anti-freeze liquid is filtered for removal of hydrocarbons and particulate matter to an extent sufficient to restore the usefulness of the anti-freeze liquid.

At least one of the filters is preferably a cartridge filter having an elongated housing containing filter media. A removable plug D is provided in the housing for introduction of a capsule containing diatomaceous earth for coating said filter media.

FIG. 1 schematically illustrates the various components of the portable serially arranged filter members for containment within a cart broadly designated as at 10 in FIG. 2 and enclosed in broken lines in FIG. 1 for clarity of illustration. The cart is positioned to be used advantageously in filtering the anti-freeze from an automotive vehicle 11 which is illustrated in FIG. 1 as having a collection pan 12 placed beneath a radiator 13 (FIG. 3). The used anti-freeze is transported through a flexible hose 14 which preferably has a quick disconnect coupling 15 to the collection pan 12. The cart is provided with a quick disconnect coupling illustrated as at 16 for receiving used anti-freeze liquid collected in the storage or collection drum 17. The used anti-freeze is transported utilizing a wand 18 through the line 19 for connection to the quick disconnect coupling 16 for passage to the serially arranged filters by opening of the valve 20. Alternatively, a valve 21 is provided for introduction of the used coolant directly to the line 22 and thence to the several filters.

A suitable coupling (not shown) is provided for connecting the line 14 through the valve 21. Suitable pumping means is provided by a motor 23 for driving an impeller pump 24 for delivering the liquid through the line 25 to a pleated paper spin in filter 26. Thus, filtered liquid is delivered through the line 27 to a cartridge filter having a housing 28. The cartridge filter will be described in greater detail below as it is especially constructed for receiving diatomaceous earth for enhancing its filtering capabilities. The anti-freeze liquid is then conveyed through the line 29 to a cartridge filter 30 capable of filtering out smaller particles as for example in the 3–10 micron range. The filtered liquid then passes through a quick disconnect coupling 31 on the cart 10 and through a suitable metering device 32 in the line 33 and thence to a container 34 for collecting purified anti-freeze liquid. If desired, a special package containing additives may be used for imparting desirable characteristics to the purified liquid.

Referring more particularly to FIG. 2, the cart 10 is illustrated as including a base 35 for receiving an upper housing member 36 containing the various filtration components. The cart is provided with wheels 37 and a handle 38. An instrument panel is illustrated as at 39 which includes a gauge 40 for measuring liquid back pressure which is indicative of the state of the filters for determining the necessity for making a change of the filters. A switch 41 is also provided for manually interrupting electrical power to the motor should the pressure exceed a predetermined limit.

Referring more particularly to FIG. 3, a suitable pet cock 13a is provided for removal preparatory to removing used coolant from drain 13. The drainage pan 12 is illustrated as being provided with a quick disconnect coupling member 15a to facilitate securement of a coupling member on the adjacent end of the hose 14. A drop-in paper filter constructed of highly absorbent pleated material is illustrated at 42. The pleated paper filter is supported by a bracket 43 carried internally of the collection pan 12 to facilitate placement and removal of the paper filter 42. Suitable pull out tabs 44 are provided.

Referring now more particularly to FIG. 4, a cartridge filter including the core 28 is illustrated in FIG. 4. The cartridge filter 28 includes an upright housing 45 which has a head 46 carried in sealing relation thereon as by utilizing a suitable O-ring 47. The head 46 includes an inlet port 48 and an outlet port 49. A paper filter cartridge is illustrated at 50 which is illustrated as being surrounded by used anti-freeze liquid. The cartridge is positioned upon a spacing member 51 carried at the bottom of the housing 45. In order to enhance the filtering capabilities of the filter, a capsule 52 contains diatomaceous earth and is degradable or dissolvable within the used anti-freeze fluid for distribution of the diatomaceous earth across the filter medium. A threaded plug 53 is received within the internally threaded portion of the cover 46 as illustrated at 53a to provide a suitable closure member which may be removed for placement of the diatomaceous earth within the filter. While the diatomaceous earth may be introduced in powder form such is difficult to measure and feed into the filter and proper introduction of the diatomaceous earth is facilitated through suitable packages such as a degradable capsule illustrated at 52.

While a preferred embodiment of the invention has been described using specific terms, such description is for illustrative purposes only, and it is to be understood that changes and variations may be made without departing from the spirit or scope of the following claims.

What is claimed is:

1. The method of filtering out hydrocarbons and particulate matter introduced into anti-freeze liquid through use in automotive vehicles comprising the steps of:

placing a pre-filter beneath an automotive vehicle for receiving used anti-freeze liquid from the cooling system of the automotive vehicle;

carrying said pre-filter in a drain pan positioning the pre-filter in the drain pan beneath said automotive vehicle for receiving and pre-filtering said anti-freeze liquid removing hydrocarbons therefrom and for receiving the pre-filtered anti-freeze liquid prior to filtering same;

providing a plurality of serially disposed filters receiving anti-freeze liquid for removing particulate matter from said pre-filtered anti-freeze liquid; and providing a cart carrying said plurality of serially disposed filters for receiving said pre-filtered anti-freeze liquid;

whereby said used anti-freeze liquid is filtered for removal of hydrocarbons and particulate matter to an extent sufficient to restore the usefulness of the anti-freeze liquid.

2. The method set forth in claim 1 including the step of providing a pleated paper spin in filter as a pre-filter of said serially disposed filters.

3. The method set forth in claim 2 including positioning cartridge filters serially following said pleated paper spin filter.

4. The method set forth in claim 1 including the step of providing a tank for storing said pre-filtered anti-freeze liquid from said pan from which said liquid is delivered to said serially disposed filters.

5. The method of filtering out hydrocarbons and particulate matter introduced into coolant liquid through use in engines having cooling systems therefor comprising the steps of:

receiving used coolant liquid from said cooling system of vehicle prior to transporting same for filtering same;

subjecting the used coolant liquid to the action of serially disposed filters for removing particulate matter from said used coolant liquid;

providing a cartridge filter having an elongated housing containing filter media; and removing a plug in said housing and introducing diatomaceous earth in a degradable package into said used coolant liquid for coating said filter media;

whereby said used coolant liquid is filtered for removal of hydrocarbons and particulate matter to an extent sufficient to restore the usefulness of the coolant liquid.

* * * * *